United States Patent [19]

Wada et al.

[11] 4,211,858

[45] Jul. 8, 1980

[54] METHOD FOR PREPARING POLYESTER

[75] Inventors: Osamu Wada; Naohiko Kusakari, both of Nagoya, Japan

[73] Assignee: Toray Industries, Inc., Tokyo, Japan

[21] Appl. No.: 25,608

[22] Filed: Mar. 30, 1979

[51] Int. Cl.$^2$ ............................................. C08G 63/18
[52] U.S. Cl. ..................................... 528/272; 528/483
[58] Field of Search .................................. 528/272, 483

[56] References Cited

U.S. PATENT DOCUMENTS

| 3,402,023 | 9/1968 | Dobo ............................. 528/272 X |
| 3,841,836 | 10/1974 | Lunsford et al. ................ 528/272 X |

FOREIGN PATENT DOCUMENTS 829748  3/1960  United Kingdom ..................... 528/272

*Primary Examiner*—Lucille M. Phynes
*Attorney, Agent, or Firm*—Armstrong, Nikaido, Marmelstein & Kubovcik

[57] ABSTRACT

In the preparation of polyester having, as the main recurring unit, alkylene aromatic dicarboxylate, the vapor of alkylene glycol is continuously blown into the polycondensation vessel to make clean the inside thereof.

10 Claims, 2 Drawing Figures

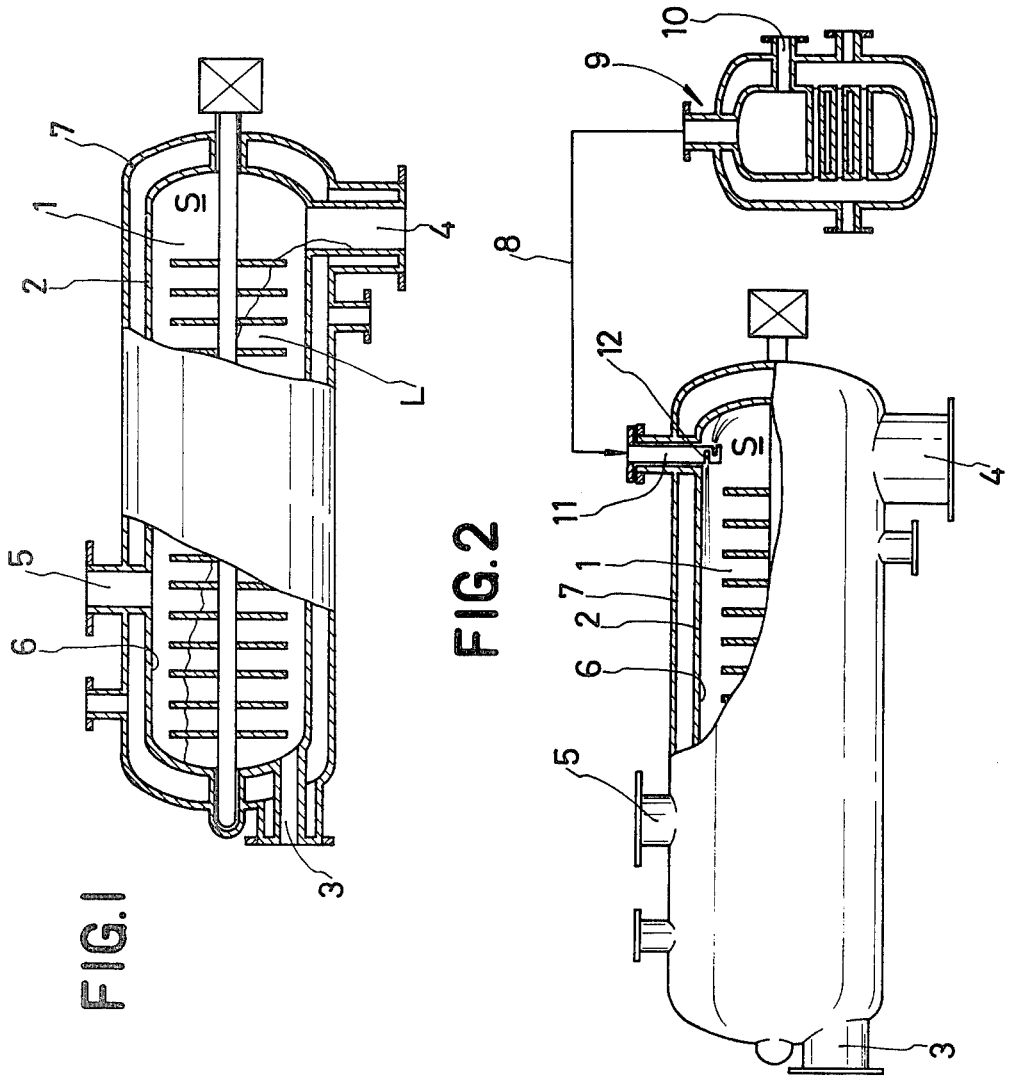

METHOD FOR PREPARING POLYESTER

BACKGROUND OF THE INVENTION

The present invention relates to a method of preparing polyester and, more particularly, such polyester of which at least 85 mol % of the recurring unit comprises alkylene aromatic dicarboxylate.

In conventional methods for the preparation of aromatic polyesters, especially polyalkyleneterephthalates, terephthalic acid or dimethyl terephthalate and alkylene glycol such as ethylene glycol are subjected to esterification or interesterification in the absence or presence of a catalyst to produce bis-(2-hydroxyethyl)-terephthalate or its oligomers, and the polyester intermediate or precursor, which is mainly composed of bis-(2-hydroxyethyl)terephthalate and/or its oligomers obtained above, is continuously charged into a polycondensation reaction vessel to be polycondensated. Such a conventional method is shown in for example the specification of U.S. Pat. No. 3,499,873.

The above conventional method is explained in detail along with FIG. 1 as follows.

The polycondensation reaction vessel in FIG. 1 is provided with a cylindrical casing 2 having therein a stirring means 1 and being heated through a jacket 7, an inlet 3 for introducing the polyester intermediate or precursor from a terminal portion of the body, an outlet 4 for taking the obtained reactant out of another terminal portion of the casing and an opening 5 leading to a source of vacuum, via which alkylene glycol is withdrawn. Liquid phase L and gas phase S mean the polycondensation reaction mixture and another part in casing 2, respectively.

When the polyester intermediate or precursor is subjected to polycondation under a high vacuum condition at an elevated temperature, normally there be come unreacted monomers and oligomers separated as entrained by alkylene glycol evaporating from the reaction mixture (such monomers and oligomers will be referred to as sublimable substances or sublimates in the following description). Therefore, if the above polycondation is operated for a long period of time, likely is that a portion of the sublimable substance becomes attached onto and accumulated on the surface of an inner wall 6 surrounding the gas phase S in the casing 2. Further, when subjected to the reduced pressure condition for a long period of time, deposited sublimates undergo, through heat experience, gelling or the like to become thermally denatured matters and, falling into the reaction mixture, become mixed with the same eventually.

Such thermally denatured substance, which increases in its amount as the time lapses, functions to adversely affect the quality of polyester to be produced and cause to occur various troubles at the time of spinning, drawing, molding or other anticipated steps.

Accordingly, one of the best ways of obtaining a desirable and constant quality of polyester fiber or a molded polyester product is to prevent the deposition of sublimates onto the inner wall of the polycondensation reaction vessel.

However, such a method has not yet been established, so that it is forced in the art today to employ a method of intermittently washing the inner wall, but this method necessarily accompanies a lowering of the rate of operation in the continuous production of polyester using the above mentioned apparatus. Therefore, a device free of the need for periodically washing the inner wall is strongly desired.

OBJECTS OF THE INVENTION

A primary object of the present invention is therefore to provide a method in which, in feeding bis-(hydroxyalkyl)terephthate into a polycondensation vessel as the raw material or an intermediate or precursor for the production of polyester and subjecting it to a polycondensation in the vessel, deposition can be prevented from occurring, of a sublimable matter about the inner wall surface of the gas phase of the vessel.

Another object of the invention is to provide a method by which polyester of a high and constant quality can be continuously produced for a long period of time.

BRIEF SUMMARY OF THE INVENTION

The above and other objects of the invention can be achieved by continuously blowing the vapor of alkylene glycol to the gas phase in a polycondensation reaction vessel in which polyester intermediate or precursor mainly composed of bis-(hydroxyalkyl)terephthalate or its oligomers is continuously polycondensated and converted into polyester.

BRIEF DESCRIPTION OF THE DRAWINGS

FIG. 1 is a partial cross-sectional view of a conventional polyester manufacturing apparatus, and FIG. 2 is a partial cross-sectional view of a polyester manufacturing apparatus according to the present invention.

DETAILED DESCRIPTION OF THE INVENTION

The present invention will now be explained in accordance with an embodiment thereof illustrated in FIG. 2.

The term "polyester intermediate or precursor" in the present invention means bis-(hydroxyalkyl)terephthalate or its mixtures containing oligomers. This is obtained by reacting aromatic dicarboxylic acid, such as terephthalic acid or isophthalic acid, or its dialkyl ester with ethylene glycol, butylene glycol or ethylene oxide. Herein, oligomers means those having a polymerization degree within a range of 2–40.

The polycondensation apparatus to be used in the present invention may be selected from conventional vertical or horizontal ones, and preferably a horizontal one such as shown in FIG. 2 may be used. This apparatus essentially has the same structural elements as the apparatus shown in FIG. 1. In other words, it has a stirring means 1, a casing 2, an inlet 3, an outlet 4 and a withdrawing opening 5, jacket 7, and moreover in the apparatus according to the present invention, a blowing nozzle 11 with a slit 12 is provided at the gas phase part S of the casing 2. The vapor of alkylene glycol is generated by means of a vapor generating means 9, which is situated at the outside of or next to the casing 2 of the apparatus, and blown into the gas phase S through connecting pipe 8, blowing nozzle 11 and slit 12. Into the vapor generating means 9, liquid alkylene glycol is supplied through a liquid charging pipe 10.

Typical examples of alkylene glycols to be blown into the gas phase of the apparatus according to the present invention are ethylene glycol, propylene glycol, and butylene glycol. Among them, alkylene glycol which has the same alkylene group as the alkylene group of bis-(hydroxyalkyl)terephthalate may be preferably used. Therefore, in the case of preparing polyethyleneterephthalate as the product polyester, preferred alkylene glycol may comprise ethylene glycol and in the case of polybutylene glycol, butylene glycol may preferably be used. The reason for the above is that alkylene glycol liberated from the polycondensate is usually reused as starting raw material.

A gas to be blown into the polycondensation vessel according to the present invention is not limited to alkylene glycol vapor, but can be any other gas, and the kind and amount of blowing of the gas may be suitably determined inasmuch as the requirement is answered that no adverse effect is likely upon the quality of the product polyester, polycondensation reaction and recovery of alkylene glycol. Preferred in the light of the above are such as the class of glycols represented by diethylene glycol and triethylene glycol or an innert gas such as nitrogen gas.

The amount of alkylene glycol to be blown into the gas phase is more than 20 mol/hr, preferably more than 30 mol/hr., to 1000 kg of the reaction mixture which remains in the polycondensation reaction vessel.

In principle, there lies no particular upper limit relative to the amount of alkylene glycol gas to be blown into. However, if alkylene glycol gas is fed in excess of a certain amount, this does not necessarily conduce to accordingly enhance the effect or advantage of the invention. Moreover, to feed an excess amount of gas indispensably requires to be greater the capacity of the vacuum source communicated with the opening 5 and its associated accessory equipments, in comparison to the capacity of the polycondensation reaction vessel. Therefore, in practice the amount of gas to be blown into the gas phase is to be maximum within a range below 600 mol/hr. or, more preferably, 400 mol/hr., per 1000 kg of the reaction mixture remaining present in the polycondensation reaction vessel.

Alkylene glycol may be blown directly into the gas phase according to any suitable method. It may be preferably blown through one or more blowing nozzles 11 situated at the gas phase part S of the casing 2 in a manner not to strike against the surface of the liquid phase. More preferably, the blowing-in of the gas may be made in a manner (a) of covering as broad a surface portion as possible of the inner wall 6 with the alkylene glycol vapor fed, or a manner (B) of letting the alkylene glycol vapor collide with the inner wall surface. Of course, such two manners both can be employed at the same time.

For practical means for practising the blow-in of gas in either or both of the above mentioned manners (A) and (B), it is proposed to provide at the gas outlet end of the nozzle 11 a slit 12 having specific configuration and size and being opened towards a specific direction. FIG. 2 illustrates an example of the structuring of nozzle 11 and two slits 12 in an instance in which both of the above two manners of gas blowing are employed.

Further, the effect of the present invention is changeable depending upon the particular location of the discharge opening 5, therefore the positioning and number of the nozzle 11 and the shape, opening direction and number of the slit 12 should be suitably determined taking into consideration the location of the opening 5. This is because the alkylene glycol evaporated from the liquid phase, containing sublimable substance, converges towards the opening 5, allowing a portion of the sublimable substance to deposit onto the surface of the inner wall 6 and because the surface area of the inner wall undergoing deposition of sublimates and the degree of sublimate deposition can therefore change according to change in the position at which the opening 5 is provided.

For example, in the case of a horizontal-type polycondensation reaction apparatus alike the one shown in FIG. 2, one or more of the nozzle 11 may be provided at each side of the inlet 3 and the outlet 4 in the event the opening 5 is provided at a longitudinally central portion of the apparatus, or may be provided at the side of inlet 3 if the opening 5 is disposed at an end portion of the apparatus close to the outlet 4.

By employing the above described method, it is feasible to considerably prolong the continuous operation time of the polycondensation reaction apparatus without an adverse influence upon the product polyester, in comparison to the conventional methods. A further advantage to be brought about according to the method of the invention consists in that such as choking of packs in the melt-spinning step, breakage or irregular elongation of fibers in the drawing step, and so forth can be remarkably suppressed.

Such effects or advantages of the present invention are through to be attributable to the following, possibly: Sublimable substances are withdrawn out of the reaction system as entrained by the alkylene glycol vapor blown into the gas phase. The inner wall surface is covered with the blown-in vapor of alkylene glycol, whereby an access onto the inner wall surface can be checked, of the sublimable substance generating from the reaction mixture in the liquid phase and rising as entrained by the alkylene glycol vapor. Further, sublimates become attached onto the wall surface, their thermal denaturing are suppressed by alkylene glycol blown in, in a manner of colliding with the wall surface, and they readily become fluidized, effectively avoiding thermal experience for along time.

The method of the present invention includes in its scope such an instance in which into a reaction system producing alkylene glycol through polycondensation reaction of a polyester intermediate or precursor, vapor of a same alkylene glycol as the one produced above is blown, and it may therefore be apprehended that the polycondensation reaction would possibly be inhibited. However, the reaction can proceed without encountering a disturbance in accord with the method of the present invention, in which alkylene glycol is supplied in the form of vapor, in a particular manner and into the gas phase, and yet in a specified amount.

It will be understood that the method of the present invention is particularly useful for continuous production of polyester.

Hereinafter, the effects of the present invention will be explained with reference to examples.

In the following examples, "fish eye" and "rate of excellency at drawing" are measured as follows:

Fish eye: The obtained polymer is converted into a biaxially oriented film and the number of foreign substances of greater than 15 microns is counted through a microscope and the number of foreign substances per gram of the polymer is referred as the number of fish eyes.

The fish eyes are foreign substances produced by thermal reactions and it is said that a polymer having fish eyes over 350/g has difficulty in producing commercially valuable final products.

Rate of Excellency at Drawing: The obtained polymer is melt-spun through nozzles, each having 36 holes, at a spinning rate of 38 g/min. and at a temperature of 285° C. and the undrawn yarn taken at 1140 m/min. is drawn to 3.36 times at 1100 m/min. by means of hot rollers at 90° C. and twisted to be wound up onto a 3 kg winding parn. 3,000 parns is thus obtained and the number of parns each of which has yarn borken at the drawing is counted.

Rate of Excellency at Drawing (%)
$$= \frac{\text{the total number of parns} - \text{the number of parns of having broken yarn}}{\text{the total number of parns}} \times 100$$

The rate of excellency at drawing is preferably above 96.5% in view of economical and operational reasons.

EXAMPLES 1-3

Terephthalic acid and ethylene glycol were continuously charged at a molar ratio of 1:1.2 into the esterification step, followed by the preliminary polymerization step and the polycondensation step, to obtain polyethyleneterephthalate having a number average molecular weight of 20,000. In the above case, the esterification was conducted at 285° C. and 10 mmHg (the number average molecular weight is 7000) and the polycondensation vessel was operated at 285° C. and 1 mmHg. Any esterification catalyst was not used but 0.03% by weight of $Sb_2O_3$ and 0.02% by weight of $H_3PO_4$ were added prior to the preliminary polymerization step as a polycondensation catalyst and a color preventing agent, respectively.

As the polycondensation vessel, the horizontal polymerization vessel shown in FIG. 2 was used and ethylene glycol was continuously charged into the evaporator, and the vapor of ethylene glycol was continuously blown into the gas phase above the polymer discharging outlet of the polymerization vessel at 20, 80 and 160 mol/hr./1000 kg in Examples 1, 2 and 3, respectively. Blowing of the ethylene glycol vapor was made by the before mentioned manners (A) and (B), with use of the nozzle shown in FIG. 2.

The operation was continuously conducted for 1 year and increase in the number of fish eyes and lowering in the rate of excellency at drawing were measured.

The results are shown in Table 1, which shows excellent effects of the present invention.

Table 1

|  | amount of alkylene glycol blown in | operating time (month) | fish eyes (number/g) | rate of excellency at drawing (%) |
|---|---|---|---|---|
| Example 1 | 20 (mol/Hr/1000 kg) | 1.0 | 16 | 99.6 |
|  |  | 2.0 | 24 | 99.5 |
|  |  | 3.0 | 40 | 99.1 |
| Example 2 | 80 (mol/Hr/1000 kg) | 4.0 | 39 | 99.2 |
|  |  | 5.0 | 44 | 99.0 |
|  |  | 6.0 | 47 | 99.0 |
|  |  | 7.0 | 51 | 99.1 |
| Example 3 | 160 (mol/Hr/1000 kg) | 8.0 | 53 | 99.1 |
|  |  | 9.0 | 53 | 99.0 |
|  |  | 10.0 | 56 | 99.0 |
|  |  | 11.0 | 60 | 99.0 |
|  |  | 12.0 | 62 | 98.8 |

Controls 1 and 2

The same conditions set forth in Examples 1-3 were used except for the blowing amount of ethylene glycol. In Control 1, the vapor of ethylene glycol was not blown. In Control 2, the vapor of ethylene glycol was blown only at 10 mol/hr/1000 kg.

Table 2

|  | amount of alkylene glycol blown in | operating time (month) | fish eyes (number/g) | rate of excellency at drawing (%) |
|---|---|---|---|---|
| Control 1 | — | 1.0 | 29 | 99.4 |
|  |  | 2.0 | 53 | 98.9 |
|  |  | 3.0 | 141 | 98.0 |
|  |  | 4.0 | 396 | 96.2 |
| Control 2 | 10 | 1.0 | 24 | 99.5 |
| (mol/hr/1000 kg) | 2.0 | 54 | 99.1 |
|  |  | 3.0 | 98 | 98.3 |
|  | 4.0 | 228 | 96.8 |  |

What is claimed is:

1. In a method for preparing polyester by polycondensation reaction of polyester intermediate or precursor mainly composed of bis-(hydroxyalkyl)terephthalate or its oligomers continuously introducing said polyester intermediate or precursor into a polycondensation reaction vessel, an improvement in which the vapor of alkylene glycol is continuously blown into the gas phase in said polycondensation reaction vessel during said polycondensation reaction.

2. A method according to claim 1, in which said bis-(hydroxyalkyl)terephthalate is bis-(2-hydroxyethyl)-terephthalate.

3. A method according to claim 1, in which said bis-(hydroxyalkyl)terephthalate is bis-(4-hydroxybutyl)terephthalate.

4. A method according to claim 1, in which said alkylene glycol is selected from the group consisting of ethylene glycol and butylene glycol.

5. A method according to claim 1, in which said alkylene glycol is alkylene glycol having the same alkylene group as alkylene group of bis-(hydroxyalkyl)-terephthalate.

6. A method according to claim 1, in which said vapor of alkylene glycol is blown at 20-600 mole/hr. per 1000 kg of the polyester intermediate or its precursor or the reaction mixture thereof remaining in the polycondensation reaction vessel.

7. A method according to claim 1, in which said vapor of alkylene glycol is blown into the vessel in a manner of colliding with the surface of the inner wall of the vessel.

8. A method according to claim 6, in which said vapor of alkylene glycol is blown into the vessel through a nozzle.

9. A method according to claim 1, in which said vapor of alkylene glycol is blown into the vessel in a manner of covering the surface of the inner wall of the vessel.

10. A method according to claim 9, in which said vapor of alkylene glycol is blown into the vessel through a nozzle.

* * * * *